(12) United States Patent
Zanella et al.

(10) Patent No.: US 7,528,528 B2
(45) Date of Patent: May 5, 2009

(54) APPARATUS FOR AUTONOMOUS POWER SUPPLY OF POWER-USING DEVICES LOCATED IN THE PROXIMITY OF A ROAD, AND PROCESS THEREFOR

(75) Inventors: Alessandro Zanella, Turin (IT); Stefano Alacqua, Rivoli (IT)

(73) Assignee: C.R.F. Società Consortile per Azioni, Orbassano (Turin) (IT)

( * ) Notice: Subject to any disclaimer, the term of this patent is extended or adjusted under 35 U.S.C. 154(b) by 101 days.

(21) Appl. No.: 11/692,600

(22) Filed: Mar. 28, 2007

(65) Prior Publication Data

US 2007/0228890 A1    Oct. 4, 2007

(30) Foreign Application Priority Data

Mar. 28, 2006   (EP)   ................... 06425208

(51) Int. Cl.
*H01L 41/113* (2006.01)
(52) U.S. Cl. ...................................... 310/339
(58) Field of Classification Search ................. 310/339
See application file for complete search history.

(56) References Cited

U.S. PATENT DOCUMENTS

| | | | | |
|---|---|---|---|---|
| 4,387,318 A | * | 6/1983 | Kolm et al. | 310/330 |
| 4,536,674 A | * | 8/1985 | Schmidt | 310/330 |
| 5,223,763 A | * | 6/1993 | Chang | 310/339 |
| 5,936,521 A | * | 8/1999 | Blackman | 340/540 |
| 5,977,690 A | * | 11/1999 | Ellis et al. | 310/330 |
| 6,011,346 A | * | 1/2000 | Buchanan et al. | 310/339 |
| 2005/0127677 A1 | | 6/2005 | Luttrull | |
| 2005/0258717 A1 | * | 11/2005 | Mullen | 310/339 |

FOREIGN PATENT DOCUMENTS

| | | |
|---|---|---|
| DE | 29618099 U1 | 1/1997 |
| GB | 2389249 A | 3/2003 |
| JP | 11-303726 * | 11/1999 |
| JP | 2001-231273 * | 8/2001 |
| JP | 2003-187378 | 7/2003 |
| JP | 2005-273644 * | 3/2006 |
| WO | WO-97-19474 * | 5/1997 |

OTHER PUBLICATIONS

European Search Report for EP Application No. 06425208.3 dated Sep. 13, 2006.

* cited by examiner

*Primary Examiner*—Thomas M Dougherty
(74) *Attorney, Agent, or Firm*—Heslin Rothenberg Farley & Mesti P.C.; Victor A. Cardona, Esq.

(57) ABSTRACT

A device for autonomous power supply of power-using devices set in the proximity of a road, along which vehicles travel, includes one or more electric-current generator elements of a piezoelectric type. The device includes at least one structural element configured for being deformable in an elastic way in at least one direction in response to a perturbation of the environment adjacent to the path of a vehicle that is travelling. The at least one structural element includes at least one area of deformation. The electric-current generator element of a piezoelectric type is associated to the area of deformation.

19 Claims, 2 Drawing Sheets

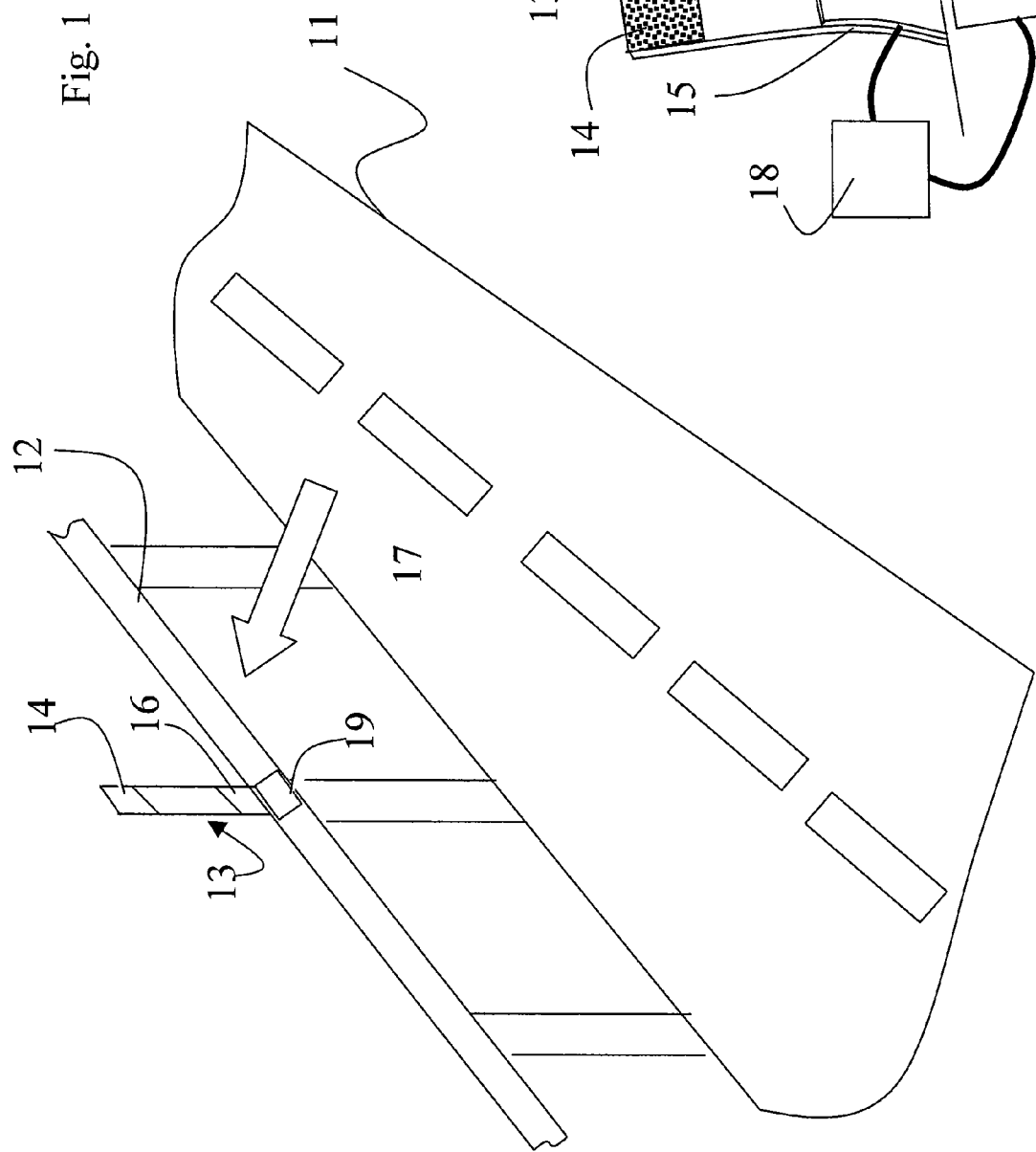
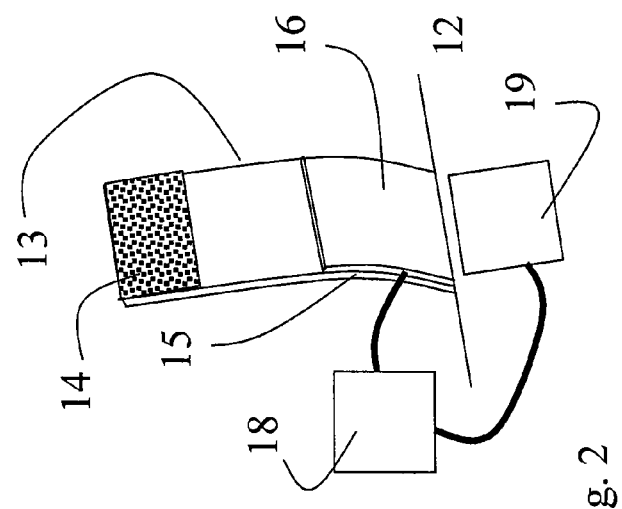

APPARATUS FOR AUTONOMOUS POWER SUPPLY OF POWER-USING DEVICES LOCATED IN THE PROXIMITY OF A ROAD, AND PROCESS THEREFOR

CROSS-REFERENCE TO RELATED APPLICATIONS

This application claims priority from European Patent Application No. 06425208.3, filed on Mar. 28, 2006, the entire disclosure of which is incorporated herein by reference.

FIELD OF THE INVENTION

The present invention relates to devices for autonomous power supply of power-using devices set in the proximity of a road, such as for example a road traveled along by motor vehicles. The invention relates in particular to a device of the type referred to above, comprising a generator of a piezoelectric type.

PRIOR ART AND ITS DISADVANTAGES

Devices of the type referred to above are known, for example, from the Japanese patent No. JP2003187378.

As is known, set at the edge of the roads traveled along by motor vehicles, such as for example motorways or other main roads, is a plurality of power-using devices of different types and having different functions. For example, set along the edge of the road are lights, or else display panels, or else control units that acquire data via sensors, for example temperature sensors or pollution sensors.

In general, supply of said power-using devices by wiring them up to the closest electrical networks is problematical in so far as the power-using devices are frequently set along the entire length of the road and hence the wiring involved is particularly long and burdensome from the standpoint of costs. It is hence necessary to envisage an autonomous supply of said kind of power-using devices, which is usually obtained by means of solar panels. Solar panels, however, present the evident drawback of not generating energy at night.

Also known are systems, such as the one described in the aforementioned document JP2003187378, which envisage the use of piezoelectric current generators, in the form of piezoelectric elements set along the path of the motor vehicles, which, by passing over said piezoelectric elements, exert thereon a pressure that is converted into an electrical signal, i.e., into energy. A similar solution presents at least the drawback that said piezoelectric generators must be set in positions on the road surface where it is certain that the motor vehicles will pass. Consequently, there are problems of positioning, as well as problems corresponding to the dimensions, in particular the surface areas, that said piezoelectric elements must have, said dimensions not being compatible with the dimensions, which are usually small and of the order of centimetres, of the piezoelectric elements currently available on the market.

AIM OF THE INVENTION

The aim of the present invention is to overcome the limits of the devices of the known art by providing in particular a device that will be able to operate in daytime and at night and that will not suffer from problems of positioning in relation to the passage of motor vehicles. In order to achieve said purpose, the subject of the invention is a device of the type referred to at the beginning of the present description and characterized moreover in that it comprises at least one structural element configured to be deformable in an elastic way in at least one direction in response to a perturbation of the space adjacent to a path of the vehicle on the road, around at least one area of deformation, to which the piezoelectric generator is mechanically associated. In this way, the piezoelectric generator undergoes the same deformations imposed upon the structural element in the area of deformation by a displacement of air and/or by a vibration transmitted through the ground generated by a motor vehicle travelling along the adjacent road. The subject of the invention is also a corresponding process.

Further preferred and advantageous characteristics are indicated in the dependent claims.

BRIEF DESCRIPTION OF THE DRAWINGS

The invention will now be described, purely by way of non-limiting example, with reference to the annexed plate of drawings, in which:

FIG. 1 represents a working diagram of the supply device according to the invention;

FIG. 2 is a schematic detailed view of the supply device of FIG. 1; and

DETAILED DESCRIPTION OF EXAMPLES OF EMBODIMENT OF THE INVENTION

Figure 3:
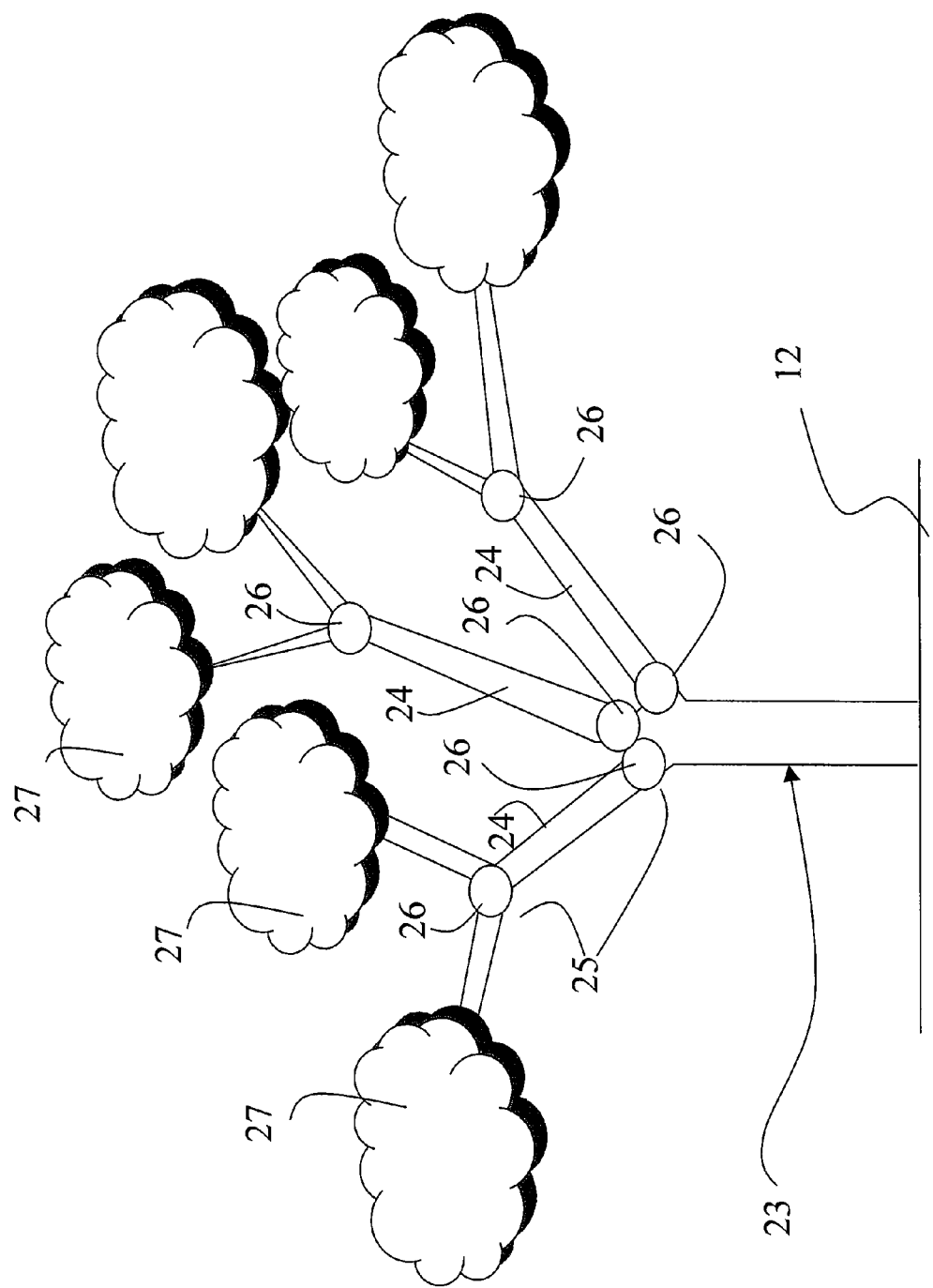
FIG. 3 is a schematic view of a preferred embodiment of the supply device according to the invention.

FIG. 1 is a schematic view of an autonomous device for supply of power-using devices set in the proximity of a road according to the invention. The reference number 11 designates a road which can be travelled along by motor vehicles. Said motor vehicles are not represented in FIG. 1. The reference number 12 designates, instead, a guard-rail of said road 11, which carries a support 13 for a reflector 14. The support 13 for the reflector has an end part 15, which is fixed to the guard-rail 12, whilst the other end part on which the reflector 14 is positioned is free to oscillate, in particular under the action of a displacement of air.

According to one aspect of the invention, associated on the end part 15 fixed to the guard-rail 12 is a piezoelectric element 16, in particular in the form of a piezoelectric plate. Also set on the guard-rail 12 is a control unit 19 for detection of pollution. Said control unit 19 is in electrical connection with the piezoelectric plate 16, from which it receives a supply current.

Consequently, operation of the supply device according to the invention occurs as described in what follows. When a motor vehicle travels along the road 11, it generates a displacement of air, indicated in FIG. 1 by the arrow 17, having a substantial component in a direction perpendicular to the direction of travel of the motor vehicle. Said displacement of air 17 hence impinges upon the support 13, causing it to bend or deform elastically. Said elastic deformation is localized prevalently around the end part 15, on which the piezoelectric element 16 is glued or to which it is associated, it being, consequently, possible for said piezoelectric element 16 to be bent accordingly, giving rise to generation of an electric current by the piezoelectric effect. Said electric current is then preferably sent, as represented in greater detail in FIG. 2, to an accumulator, designated by the reference number 18, which in turn supplies the control unit 19.

It is consequently clear that, whereas the energy generated upon passage of a single motor vehicle is limited, a multiplicity of motor vehicles, which in time brings about a sequence of displacements of air 17, in turn brings about a series of deformations of the supporting element 13, in particular in the area of the end part 15 and, consequently, a corresponding number of generations of packets of electric current by the piezoelectric element 16. Said electric current is collected via an accumulator 18, which can then supply to the control unit 19 the electrical energy when this is required. It is moreover clear that, since the support 13 is responsive to the displacement of air, it does not require any particularly accurate positioning other than a positioning that enables it to be impinged upon by said displacement of air. Since the displacement of air 17, being originated by a motor vehicle, usually involves a front with a surface much greater than that of the support 13, the positioning is far from critical. It is clear that it is possible for the support 13 to be positioned in other ways, for example, horizontally jutting out in cantilever fashion from the guard-rail 12 towards the centre of the road.

The piezoelectric element 16 can be made via one or more elements in the form of piezoelectric sheets or plates. Said piezoelectric sheets or plates may be single-layer piezoelectric elements, for example, of a ceramic type, applied in such a way as to be congruent with the area of deformation in a position corresponding to the end part 15. They may likewise be two-layer generators of the bender type, or else multilayer generators of the stack type. The piezoelectric material used may also be, instead of ceramic material, polymeric material, and in general the piezoelectric elements may be of the thin-film type. By way of example, the piezoelectric elements used generate voltages higher than 100 V and powers in the region of 50 mW for surfaces of 2.5 cm×2.5 cm.

FIG. 3 illustrates a preferred embodiment of the supply device according to the invention. Schematically represented in said figure is in fact an artificial shrub 23. Said artificial shrub 23 is made, for example, of plastic material and comprises a plurality of branches 24 bearing leaves 27. Positioned at bifurcations 25 of said branches 24 are piezoelectric elements 26, similar to the piezoelectric elements 15 described with reference to FIGS. 1 and 2. Consequently, associated to the artificial shrub 23 is a plurality of piezoelectric elements 26 which are located at the bifurcations 25, are, consequently, set in a position corresponding to a plurality of bending and deformation areas of the same type as the end part 15 and are hence able to collect as a whole a much greater energy, originated by the deformation of the plurality of branches 24 with the passage of the motor vehicle. In other words, adoption of a plurality of branches 24 enables more effective collection of the energy associated to the displacement of air 17. Said artificial shrubs 23 can be set either at the sides of the road 11 or, for example in the case of a motorway, in the position where shrubs are usually provided to function as screens for the headlights of oncoming motor vehicles, i.e., on the traffic divider between two carriageways of the road. In said position on the traffic divider, advantageously, the shrubs are impinged upon by the displacements of air caused by motor vehicles in motion in either direction of travel. In this way, the shrubs 23 can effectively unite to the function of generation of energy for a power-using device that can be represented once again by the control unit 19 for detection of pollution, or else other types of power-using devices, the function of screening from oncoming headlights, as well as the aesthetic functions usually performed by natural or artificial shrubs. It may be noted that it is also possible to apply simply piezoelectric elements to a natural shrub, although the artificial shrub is suited to being shaped in such a way as to maximize the efficiency of the device.

According to a possible variant of the artificial shrub illustrated in FIG. 3, as an alternative or in addition to the piezoelectric elements 26 set on the bifurcations 25 of the branches 24, the leaves 27 of said shrub 23 are made of sheets of polymeric piezoelectric material. Consequently, the energy is obtained by the impact of the displacement of air on said leaves 27.

The device so far described is not only able to draw energy from the displacement of air caused by motor vehicles, but is also able to draw energy from other perturbations of the environment adjacent to the path of the vehicle, in particular from the vibration of the ground caused by the passage of the motor vehicle and transmitted by the ground and, possibly, by the guard rail on which the device is positioned. In other words, the vibration that reaches the piezoelectric element and stimulates it in ways compatible with its arrangement determines production of electrical energy.

The vibrations transmitted by the ground upon passage of the motor vehicle constitute a perturbation of longer duration than the perturbation associated to the displacement of air. Consequently, even though in general the amplitude of the vibrational waves is smaller, the integral energy associated to the passage of a vehicle is in any case rather high. In appropriate conditions, when, for example, the device according to the invention is located at a distance greater than a threshold distance, the contribution of said vibrational energy can even be greater than the contribution due to the displacement of air. In addition, the contribution of energy is caused by the coupling of the frequencies of the perturbation, which are higher for the vibrations and lower for the displacement of air, with the electronics that manages energy accumulation. Consequently, the device according to the invention is in general able to capture, according to different strategies of energy scavenging that involve positioning and control of the device, any perturbation that is likely to create deformations of the piezoelectric element, either jointly or separately.

It is clear that the invention is not limited just to the application in control units that govern sensors, such as pollution sensors, temperature sensors or sensors of other kinds, but can with equal effectiveness be applied to other types of power-using devices, such as lamps for lighting, panels for displaying information, and any other power-using devices that may be set along the edge of the road.

It is moreover clear that, in addition to roads traveled along by motor vehicles, also to be considered as falling within the scope of the invention are all the paths traveled along by vehicles that may enable a sufficient generation of energy, for example, railway lines.

Finally, it is clear that the device described is not limited only to drawing energy from the displacement of air or from the vibrations of the ground, but also from any other type of perturbation of the environment adjacent to the path of the vehicle that is likely to stimulate the piezoelectric element for generation of electrical energy.

What is claimed is:

1. A device for autonomous power supply of power-using devices set in the proximity of a road along which vehicles are travelling, comprising:
   one or more electric-current generator elements of a piezoelectric type,
   at least one structural element deformable in an elastic way in at least one direction in response to a perturbation of the environment adjacent to the path of a vehicle, said at least one structural element comprising at least one area of deformation, said electric-current generator element of a piezoelectric type being associated to said area of deformation;

wherein said at least one structural element comprises a first structural element of a plurality of structural elements, said plurality of structural elements is at least one of shaped and interconnected so as to represent a plant or a shrub.

2. The device according to claim 1, wherein said perturbation of the environment adjacent to the path of a vehicle travelling comprises a displacement of air caused by said vehicle.

3. The device according to claim 1, wherein said perturbation of the environment adjacent to the path of a vehicle travelling comprises a vibration caused on the ground by the passage of the vehicle and transmitted by the ground to said device.

4. The device according to claim 1, wherein said power-using devices comprise a lamp for lighting.

5. The device second according to claim 1, wherein said at least one structural element comprises a first structural element of a plurality of structural elements.

6. The device according to claim 1, wherein said plurality of structural elements is at least one of shaped and interconnected so as to represent a plant or a shrub.

7. The device according to claim 6, wherein said electric-current generator elements of a piezoelectric type are associated to points of bending of branches of said plant or shrub.

8. The device according to claim 6, wherein said electric-current generator elements of a piezoelectric type are associated or integrated in leaves of said plant or shrub.

9. The device according to claim 1, further comprising an accumulator, which is electrically connected to said one or more piezoelectric elements and is able to accumulate electrical energy to supply the energy to said power-using devices.

10. The device according to claim 1, wherein said power-using devices comprise a data-acquisition control unit.

11. The device according to claim 1, wherein said power-using devices comprise one or more panels for displaying information.

12. A process for supplying autonomously power-using devices set in the proximity of a road along which vehicles are travelling, which comprises:
arranging one or more electric-current generator elements of a piezoelectric type;
setting in the proximity of the road at least one structural element deformable in an elastic way in at least one direction in response to a perturbation of the environment adjacent to the path of a vehicle travelling along said road, the at least one structural element comprising a first structural element of a plurality of structural elements and the plurality of structural elements at least one of shaped and interconnected so as to represent a plant or a shrub; and
associating said generator of electric current of a piezoelectric type to at least one area of deformation identified in said at least one structural element.

13. A method for generating electric energy from a flow of air, comprising:
providing at least one piezoelectric electric current generator element configured to be actuated by the flow of air, wherein the at least one piezoelectric generator element is associated to at least one structural element elastically deformable in at least one direction when subjected to the flow of air, the at least one structural element comprising at least one area of deformation, the at least one piezoelectric electric current generator element associated to the at least one area of deformation; and
locating the at least one piezoelectric generator element in the proximity of a road along which vehicles are travelling, such that the piezoelectric generator element exploits the displacement of air caused by the vehicles travelling along the road to generate electric current.

14. The method of claim 13, wherein the at least one structural element is a supporting arm of a reflector.

15. The method of claim 13, wherein the at least one structural element is a supporting arm of a reflector.

16. The method of claim 13, further comprising electrically connecting an accumulater to the at least one piezoelectric element and accumulating electrical energy to supply the energy to at least one power-using device.

17. The method of claim 16, wherein the at least one power-using device comprises a data-acquisition control unit.

18. The method of claim 16, wherein the at least one power-using device comprises one or more panels for displaying information.

19. The method of claim 16, wherein the at least one power-using device comprises a lamp for lighting.

* * * * *